(No Model.)
J. H. KENNEDY.
REVERSIBLE GLOBE VALVE.
No. 303,021. Patented Aug. 5, 1884.
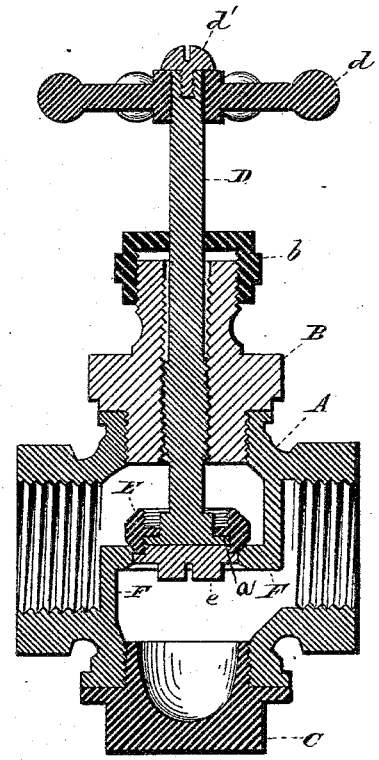
WITNESSES
W. Engel
Geo. W. King
INVENTOR
John H. Kennedy
By Leggett & Leggett
ATTORNEYS

UNITED STATES PATENT OFFICE.

JOHN H. KENNEDY, OF CLEVELAND, OHIO.

REVERSIBLE GLOBE-VALVE.

SPECIFICATION forming part of Letters Patent No. 303,021, dated August 5, 1884.

Application filed July 6, 1883. (No model.)

*To all whom it may concern:*

Be it known that I, JOHN H. KENNEDY, of Cleveland, in the county of Cuyahoga and State of Ohio, have invented certain new and useful Improvements in Reversible Globe-Valves; and I do hereby declare the following to be a full, clear, and exact description of the invention, such as will enable others skilled in the art to which it pertains to make and use the same.

My invention relates to improvements in globe-valves; and it consists in certain features of construction and in combination of parts hereinafter described, and pointed out in the claim.

The drawing represents a vertical sectional view of my improved globe-valve.

A represents the body of the valve, provided in the usual manner with an opening on both ends, and is threaded to receive a pipe, the one acting as a receiving and the other as a disharging orifice. Above and below are also orifices, the walls of which are threaded, the one engaging the part B and the other engaging the plug C. These two parts, B and C, are interchangeable, the threaded parts with which they respectively engage being alike. The part B is a nut for the valve-stem D, and, with the cap b, furnishes a stuffing-box for the said valve-stem. The outer end of the valve-stem may be squared to receive the hand-wheel d, that is held upon its seat by the screw d', while the lower end of the stem has a disk or projections, a, as shown, that engage the disk or valve E, and is held to this engagement by the plug e that screws into the said valve. As is shown, the valve E is beveled on each side, and the inside of the wall is threaded on both sides of the partition, to engage the plug e, so that the said valve may be reversed on the stem, and is thus provided with two faces, either of which may engage the valve-seat when required. The partition F, as is shown, has a seat on either side adapted to engage the valve, and by interchanging the parts B and C the valve may be made to engage the seat on the partition F, that is opposite the side where the engagement is shown. There is, therefore, a double-faced valve and two valve-seats. In many cases, when the upper seat on the partition F has become worn, and it is desired to change the valve so as to engage the other seat, it would not be convenient or even practicable to change the places of the parts B and C, and have the valve-stem extend and be operated below; also, if the valve has been in place for a considerable length of time it would be difficult to reverse the part A—that is, to turn it bottom upward; and even if it could be done it would "break the joints," and cause them to leak. In such a case it is only necessary to remove the plug C and separate so many of the pieces that the valve-stem, with the valve attached, may be thrust up from below, which of course will bring the valve below the partition F and engage the lower seat. The parts may then be reassembled with the valve-stem above, and with parts B and C occupying their same respective places as before.

If desired, the parts may be first assembled so as to bring the valve E and the plug C on the same side of the partition F, and of course with the valve-stem extending through the part B on the opposite side of the valve.

What I claim is—

The combination, with the valve-seat, of the double-faced valve provided with a central partition, and screw-threaded openings or sockets on opposite sides of said partition, the valve-stem provided with the disk or projections a, that engage said partition, and a screw-threaded plug, substantially as set forth.

In testimony whereof I sign this specification, in the presence of two witnesses, this 30th day of June, 1883.

JOHN H. KENNEDY.

Witnesses:
   ALBERT E. LYNCH,
   CHAS. H. DORER.